US012647509B2

(12) United States Patent
Berget et al.

(10) Patent No.: US 12,647,509 B2
(45) Date of Patent: Jun. 2, 2026

(54) APPLICATION-SPECIFIC DO NOT DISTURB CONFIGURATION

(71) Applicant: Apple Inc., Cupertino, CA (US)

(72) Inventors: Erik M. Berget, San Francisco, CA (US); David A. Schaefgen, San Jose, CA (US); Evan C. Wineland, Santa Clara, CA (US); Justin S. Titi, San Jose, CA (US); Matthew E. Shepherd, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 467 days.

(21) Appl. No.: 18/138,689

(22) Filed: Apr. 24, 2023

(65) Prior Publication Data

US 2023/0396705 A1      Dec. 7, 2023

Related U.S. Application Data

(60) Provisional application No. 63/349,028, filed on Jun. 3, 2022.

(51) Int. Cl.
| | |
|---|---|
| *H04W 24/02* | (2009.01) |
| *H04M 1/72* | (2021.01) |
| *H04M 1/72463* | (2021.01) |
| *H04M 1/72469* | (2021.01) |
| *H04M 1/72484* | (2021.01) |
| *H04W 88/02* | (2009.01) |

(52) U.S. Cl.
CPC ... *H04M 1/72463* (2021.01); *H04M 1/72469* (2021.01); *H04M 1/72484* (2021.01)

(58) Field of Classification Search
CPC ......... H04M 1/72463; H04M 1/72469; H04M 1/72448; H04M 1/72484

USPC ........................................................ 455/418
See application file for complete search history.

(56) References Cited

U.S. PATENT DOCUMENTS

| | | | |
|---|---|---|---|
| 9,641,669 B2 | 5/2017 | Ziemianska et al. | |
| 11,362,974 B2 | 6/2022 | Siddiq | |
| 2006/0090169 A1* | 4/2006 | Daniels ................. | G06F 3/0481 |
| | | | 719/329 |
| 2009/0165145 A1 | 6/2009 | Haapsaari et al. | |
| 2011/0230209 A1 | 9/2011 | Kilian et al. | |
| 2012/0250517 A1* | 10/2012 | Saarimaki ......... | H04M 1/72454 |
| | | | 370/259 |

(Continued)

FOREIGN PATENT DOCUMENTS

| | | |
|---|---|---|
| CN | 108139915 B | 10/2020 |
| JP | 2019-160226 | 9/2019 |

OTHER PUBLICATIONS

IP.com search history (Year: 2025).*

(Continued)

*Primary Examiner* — Moustapha Diaby
(74) *Attorney, Agent, or Firm* — BAKERHOSTETLER

(57) ABSTRACT

The subject disclosure provides systems and methods for application-specific do not disturb configuration for electronic devices. For example, a system process may store a set of interruption control mode identifiers of user-selected configuration options associated with an application. When the device is operated in an interruption control mode, such as a do not disturb mode, the system process may provide a set of interruption control mode identifiers to the application to facilitate operation of the application according to the user-selected configuration options.

20 Claims, 5 Drawing Sheets

400

(56)            References Cited

U.S. PATENT DOCUMENTS

| 2014/0277932 | A1* | 9/2014 | Prakah-Asante | ............................ |
| | | | | H04M 1/72412 |
| | | | | 701/36 |
| 2015/0133089 | A1 | 5/2015 | Warr | |
| 2015/0133098 | A1 | 5/2015 | Warr | |
| 2016/0062590 | A1* | 3/2016 | Karunamuni | ....... G06F 3/04883 |
| | | | | 715/863 |
| 2018/0212906 | A1* | 7/2018 | Phanshikar | ........... H04L 51/063 |
| 2021/0044693 | A1* | 2/2021 | Yu | ..................... H04M 1/72463 |
| 2021/0089371 | A1* | 3/2021 | Zhang | ..................... G06F 9/542 |
| 2021/0092219 | A1* | 3/2021 | Hwang | ............ H04M 1/72463 |
| 2021/0256786 | A1* | 8/2021 | Manam | ................... G10L 25/51 |
| 2022/0360667 | A1* | 11/2022 | Chen | ................ H04M 3/42187 |

OTHER PUBLICATIONS

European Office Action from European Patent Application No. 23733543.5, dated Apr. 15, 2025, 7 pages.

Written Opinion of the International Preliminary Examining Authority from PCT/US2023/023907, dated May 31, 2024, 9 pages.

International Preliminary Report on Patentability from PCT/US2023/023907, dated Sep. 10, 2024, 10 pages.

Invitation to Pay Additional Fees from PCT/US2023/023907, dated Aug. 10, 2023, 10 pages.

International Search Report and Written Opinion from PCT/US2023/023907, dated Oct. 2, 2023, 16 pages.

Japanese Patent Application No. 2024-571010; Notice of Reasons for Refusal dated Nov. 20, 2025, 6 pages with machine translation.

Indian Patent Application No. 2024-17092926; First Examination Report dated Feb. 17, 2025, 9 pages with machine translation.

* cited by examiner

400

402

STORE INFORMATION ASSOCIATED WITH A FIRST CONFIGURATION OPTION OF A PLURALITY OF CONFIGURATION OPTIONS FOR AN INTERRUPTION CONTROL MODE

404

RECEIVE AN INDICATION OF A TRIGGERING EVENT FOR THE INTERRUPTION CONTROL MODE

406

SEND THE INFORMATION ASSOCIATED WITH THE FIRST CONFIGURATION OPTION TO AN APPLICATION

500

502
SEND , BY AN APPLICATION PROCESS, A TEMPLATE ASSOCIATED WITH AN APPLICATION

504
RECEIVE, BY THE APPLICATION PROCESS, INFORMATION INDICATING A SELECTED CONFIGURATION OPTION OF THE PLURALITY OF CONFIGURATION OPTIONS

506
OPERATE, BY THE APPLICATION PROCESS, IN ACCORDANCE WITH THE SELECTED CONFIGURATION OPTION

APPLICATION-SPECIFIC DO NOT DISTURB CONFIGURATION

CROSS REFERENCE TO RELATED APPLICATIONS

This application claims the benefit of priority to U.S. Provisional Patent Application No. 63/349,028, entitled, "Application-Specific Do Not Disturb Configuration", filed on Jun. 3, 2022, the disclosure of which is hereby incorporated herein in its entirety.

TECHNICAL FIELD

The present description relates generally to receiving and processing data associated with a mobile device, which may include, for example, data for application-specific do not disturb configurations for electronic devices.

BACKGROUND

Electronic devices may include a do not disturb option. When the do not disturb option is activated on an electronic device, one or more notifications on the electronic device may be silenced.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
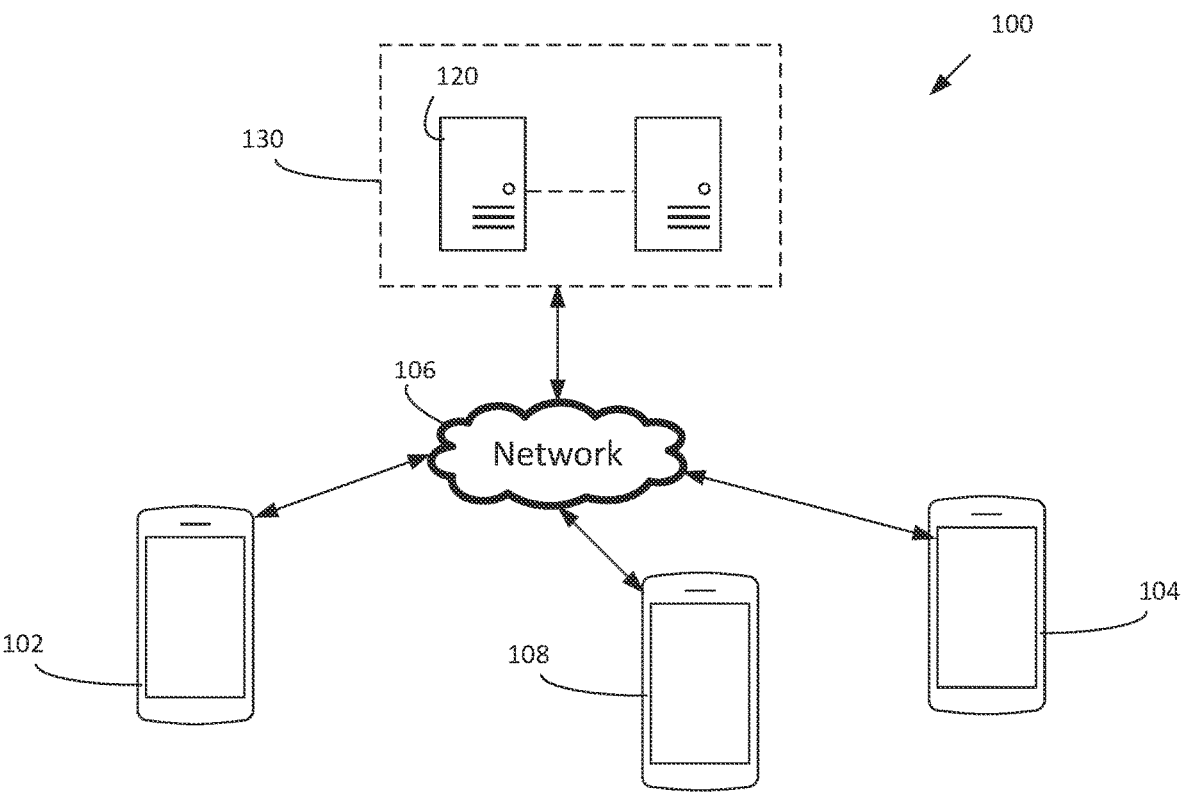
FIG. 1 illustrates an example network environment in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Electronic devices such as personal computers (e.g., desktop computers and laptop computers), portable electronic devices (e.g., tablet computers and smartphones) and wearable devices (e.g., smartwatches, etc.) often include applications that receive and process data, which may be generated locally or from another electronic device or a server over a network. In an example, an electronic device may include a messaging application that receives and processes electronic messages (e.g., including text, images, video content, audio content, or other objects). A user of an electronic device may send a message to a remote electronic device of a contact, in which the remote electronic device receives a notification when received. In another example, applications may automatically send notifications based on information, such as location, date, time, heart rate of a user, a social media post of another user, or other triggers. Such notifications may be desired at times by a user but may also be distracting. Therefore, an electronic device may operate in one or more interruption control modes, which may give a user reprieve from certain types of notifications from one or more applications. When in interruption control mode, an interruption (e.g., an event or notification) from an application may be silenced based on a received filter indicator (e.g., filterCriteria and predicate) associated with each interruption of the application.

In accordance with one or more implementations of the subject technology, a system process may store a set of interruption control mode identifiers of user-selected configuration options associated with an application. When the device is operated in an interruption control mode, such as a do not disturb mode, the system process may provide a set of interruption control mode identifiers to the application to facilitate operation of the application according to the user-selected configuration options. The set of interruption control mode identifiers may be used by the application to configure the user interface of the application that is provided for display to the user. For example, certain aspects of the user interface may be hidden in certain interruption control modes, such as an email application hiding display of personal emails while in a work mode. The disclosed subject matter may allow for privacy and a simplified architecture for providing application-specific configurations for one or more interruption control modes, in which configurations may be tailored to subsets of the application (e.g., work email vs. personal email notifications).

FIG. 1 illustrates an example network environment 100 that includes various devices in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes electronic device 102, electronic device 104, electronic device 108, network 106, or one or more servers 120 communicatively coupled with network 106. Network 106 may include portions of a public network such as the Internet. Network 106 may include local area network (LAN) components, such as Wi-Fi routers or Ethernet connections that are local to each of electronic device 102 or electronic device 104, that couple the corresponding electronic device to the wider Internet. A LAN that connects electronic device 102, electronic device 104, or electronic device 108 to the Internet may include one or more different network devices or network mediums or may utilize one or more different wireless or wired network technologies, such as Ethernet, optical, Wi-Fi, Bluetooth, Zigbee, Powerline over Ethernet, coaxial, Z-Wave, generally any wireless or wired network technology that may communicatively couple an electronic device to the Internet. Portions of the network 106 include a cellular communications network that includes one or more base transceivers at fixed locations in each of several geographic "cells", the base transceivers communicating wirelessly with end devices such as electronic device 102, electronic device 104, or electronic device 108, and via wired or satellite communications with various switched networks for voice calls and text messages, mobile data, and public telephony.

Electronic device 102, electronic device 104, or electronic device 108 may send or receive messages such as text messages, multi-media messages, social-media messages, or other network data, to or from each other, or to or from other electronic devices directly or via the network 106. Electronic device 102, electronic device 104, or electronic device 108 may process received or generated messages and may determine whether to provide a notification (e.g., visual or audio notifications). Electronic device 102, electronic device 104, or electronic device 108 may also receive messages or other network data from or via one or more servers, such as servers 120. In one or more implementations, network data exchanged between the electronic device 102, electronic device 104, or electronic device 108 may include links or other references to other data that is available over the network 106, such as from the one or more servers 120.

One or more of the electronic device 102, electronic device 104, or electronic device 108 may be, for example, a portable computing device such as a laptop computer, a smartphone, a smart speaker, a peripheral device (e.g., a digital camera or headphones), a digital media player, a tablet device, a wearable device (e.g., a smartwatch or a band), or any other appropriate device that includes or is communicatively coupled with, for example, one or more wired or wireless interfaces, such as Wi-Fi communications circuitry, cellular communications circuitry, Bluetooth communications circuitry, Zigbee communications circuitry, near field communication (NFC) communications circuitry, or other wired or wireless communications circuitry, and may be provided with software or hardware for sending or receiving network data, such as electronic messages.

By way of example, in FIG. 1 each of the electronic device 102, electronic device 104, or electronic device 108 is depicted as a smart phone. In one or more implementations, one or more electronic devices (e.g., electronic device 102, electronic device 104, or electronic device 108) may be or include a smart television, a laptop, or a mobile device (e.g., a smart phone or a smart watch). In one or more implementations, one or more of the electronic devices may be integrated into its corresponding display device. One or more of the electronic devices may be, or may include all or part of, the electronic system discussed below with respect to FIG. 6.

The electronic device 102, electronic device 104, or electronic device 108 may include a processor, a memory, a communication interface, or other electronic components. The processor may include suitable logic, circuitry, or code that enable processing data or controlling operations of the device. In this regard, the processor may be enabled to provide control signals to various other components of the device. The processor may also control transfers of data between various portions of the device. Additionally, the processor may enable implementation of an operating system (e.g., system process 202) or otherwise execute code to manage operations of the device. The memory may include suitable logic, circuitry, or code that enable storage of various types of information such as received data, generated data, code, or configuration information. The memory may include, for example, random access memory (RAM), read-only memory (ROM), flash, or magnetic storage. In one or more implementations, one or more of the processors, the memory, the communication interface, or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) or a combination of both.

One or more of the servers 120 may be, or may include, all or part of the electronic system discussed below with respect to FIG. 6. Each of the servers 120 may include one or more servers, such as a cloud 130 of servers. For explanatory purposes, two servers are shown and discussed with respect to various operations for providing network data to or between electronic device 102, electronic device 104, or electronic device 108. However, these and other operations discussed herein may be performed by one or more servers, and each different operation may be performed by the same or different servers.

For explanatory purposes, the network environment 100 is illustrated in FIG. 1 as including electronic device 102, electronic device 104, or electronic device 108, and the servers 120; however, the network environment 100 may include any number of electronic devices and any number of servers.

Figure 2:
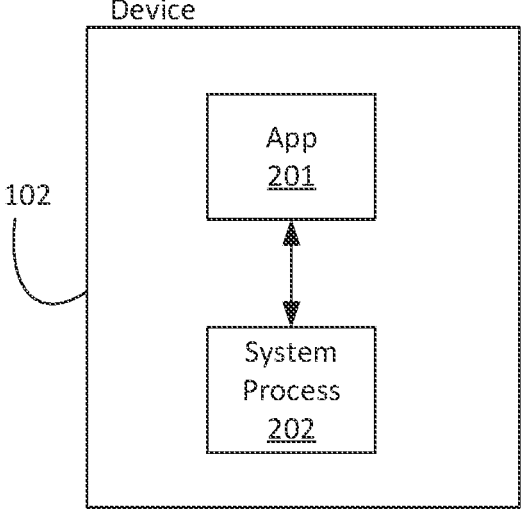
FIG. 2 illustrates various aspects of an electronic device in accordance with aspects of the disclosure.

FIG. 2 illustrates various aspects of an electronic device in accordance with aspects of the disclosure. In the example of FIG. 2, electronic device 102 includes application 201 (e.g., stored in memory at the device and executable by one or more processors of the device) or system process 202. Application 201 may receive network data (e.g., over a network 106, from another electronic device such as electronic device 104, or from system process 202). For example, the network data may include a message from electronic device 104 or server data (e.g., a push notification, web content for a web page, social media content, or other server data that has been provided to server 120 by a contact of electronic device 102 to be obtained by electronic device 102). Network data may include content (e.g., message content) such as text, images, emojis, videos, audio, or the like.

As disclosed in more detail herein, system process 202 may be communicatively connected with application 201, such as via inter-process communication and/or one or more application programming interface (API) calls. System process 202 may receive information (e.g., configuration information) from application 201 or send information to application 201. It is contemplated that, in one or more implementations, system process 202 may not have semantic understanding of the information received from or sent to application 201 (e.g., application configuration is opaque to the operating system which may assist with privacy). In addition, the application may not be explicitly aware of the device being in interruption control mode (e.g., the operating system configuration is opaque to the application).

Figure 3:
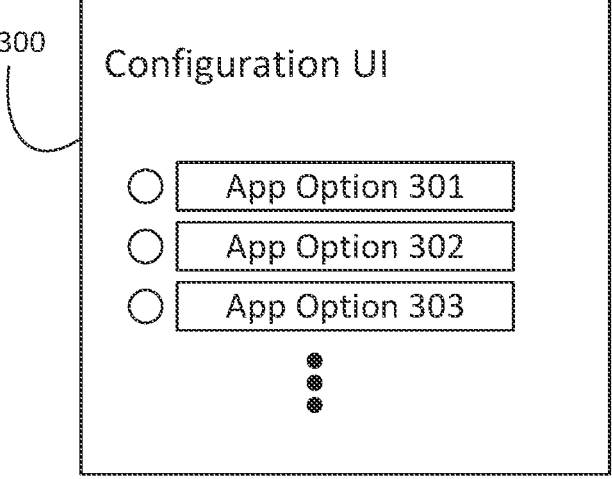
FIG. 3 illustrates an exemplary image of a configuration user interface.

FIG. 3 illustrates an exemplary image of a configuration user interface 300. Configuration user interface 300 may include a plurality of configuration options in a template (also referred to herein as a fillable form). The plurality of configuration options may include application ("app") option 301, app option 302, or app option 303, which may be selected by a user. The configuration options may facilitate an interruption control mode for electronic device 102.

In an example, when a configuration option is selected, a system process may store information associated with the one or more configuration options for the interruption control mode (e.g., do not disturb (DND)) and respond to predetermined triggers. Example application configuration options may include hiding one or more aspects of a user interface of an application (e.g., hiding a chat window in a work mode), controlling notifications within the application, controlling data surfaced by the application (e.g., work emails vs personal emails), or the like. The disclosed subject matter allows for per-application feature granularity for interruption control mode in one or more applications, such as email application (e.g., based on subset of emails—work vs. personal), calendar application (e.g., subset of calendars—work vs. personal), messaging application, or social media application, among others.

Figure 4:
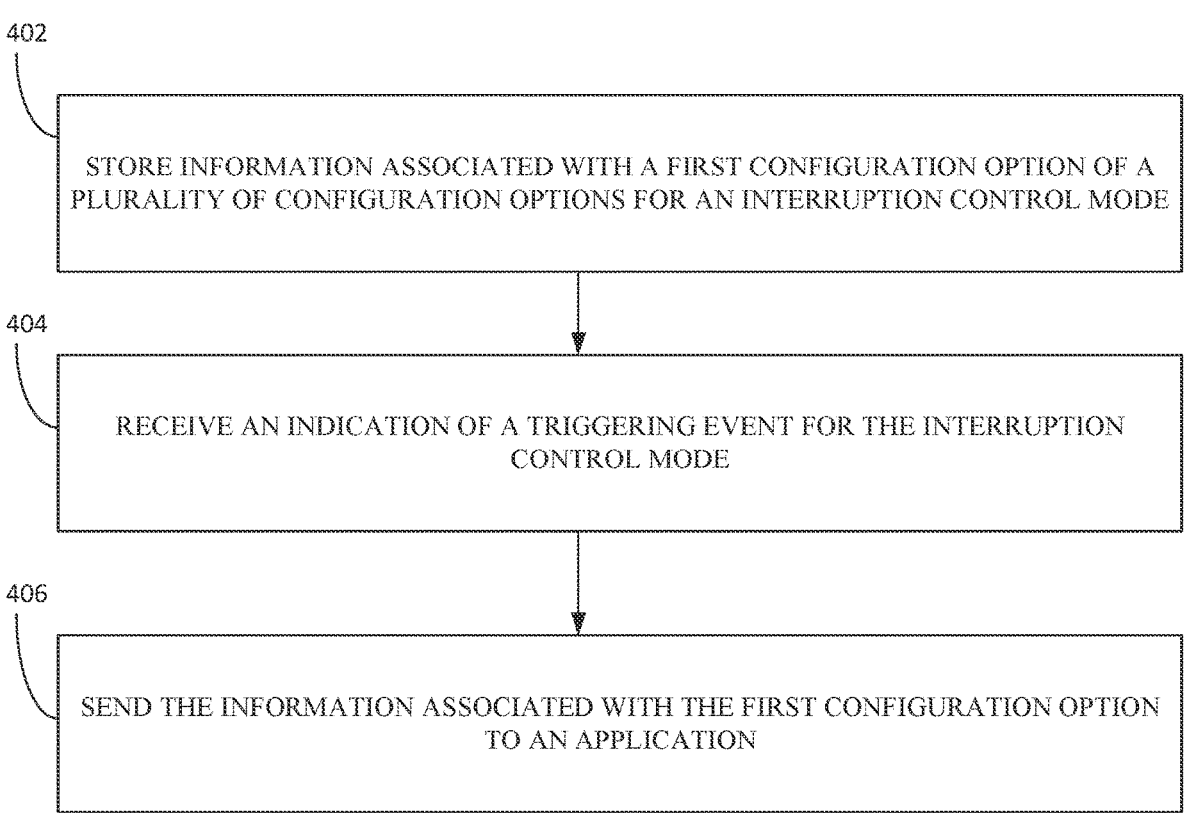
FIG. 4 illustrates a flow diagram of an example process associated with application-specific do not disturb in accordance with one or more implementations.

FIG. 4 illustrates a flow diagram of an example process associated with application-specific do not disturb in accordance with one or more implementations. For explanatory purposes, the process 400 is primarily described herein with reference to the electronic device 102 of FIG. 1. However, the process 400 is not limited to the electronic devices 102 of FIG. 1, and one or more blocks (or operations) of the process 400 may be performed by one or more other components or other suitable devices. Further for explanatory purposes, the blocks of the process 400 are described herein as occurring in serial or linearly. However, multiple blocks of the process 400 may occur in parallel. In addition, the blocks of the process 400 need not be performed in the order shown or one or more blocks of the process 400 need not be performed or can be replaced by other operations.

At block 402, system process 202 at electronic device 102 of a first user (e.g., an electronic device that is registered to an account of the first user or that is signed into the account of the first user) may store information associated with a first configuration option (e.g., app option 301) of a plurality of configuration options associated with an interruption control mode. Before storing the first configuration option, configuration user interface 300 may be presented on a display of electronic device 102. Configuration user interface 300 may be based on a template. In one or more implementations, the template may be received by system process 202 from application 201. The template may be designed to correspond with the particular operations (e.g., notifications) of application 201.

The storing of information associated with the first configuration option may include storing a set of interruption control mode identifiers (e.g., the identifiers may be an alpha numeric sequence not semantically understood by system process 202) of user-selected configuration options for the application without receiving or storing the user-selected configuration options (e.g., text that plainly describes the option to the user). In an example, the first configuration option may be a user-selected configuration option associated with application 201. The first configuration option may be associated with delaying or allowing notification of a function of application 201 when a threshold time period is reached, when a threshold location is reached, or other trigger occurs.

At block 404, an indication of a triggering event for the interruption control mode may be received by system process 202 or application 201. A triggering event may be based on time period, location, or use of a second application on electronic device 104, among other things. An example use of a second application may include a video conferencing application, an exercise application, or a voice call. It is also contemplated herein that a user may set the interruption-control mode. Exemplary interruption control mode may be defined as a work mode, a fitness mode, a sleep mode, or scheduled meeting mode.

At block 406, the information associated with the first configuration option may be sent to application 201. The information associated with the first configuration option may be provided without informing the application of the interruption-control mode. The information may be sent in response to the triggering event of block 404. When the information is received by application 201, application 201 may execute operations based on the first configuration option, in which the first configuration option may indicate application 201 silence an interruption (e.g., mute an audio or visual notification or prevent an event from being further processed by system process 202 for a threshold time period or geographic area). As disclosed, the information associated with the first configuration option may include interruption control mode identifiers that may be utilized by application 201 to identify the first configuration option associated with one or more of the plurality of configuration options for the interruption control mode. It is contemplated herein that interruption control mode identifiers may include default identifiers that facilitate restoration of interruption control mode to a previous configuration. The default identifiers may be received from application 201.

Figure 5:
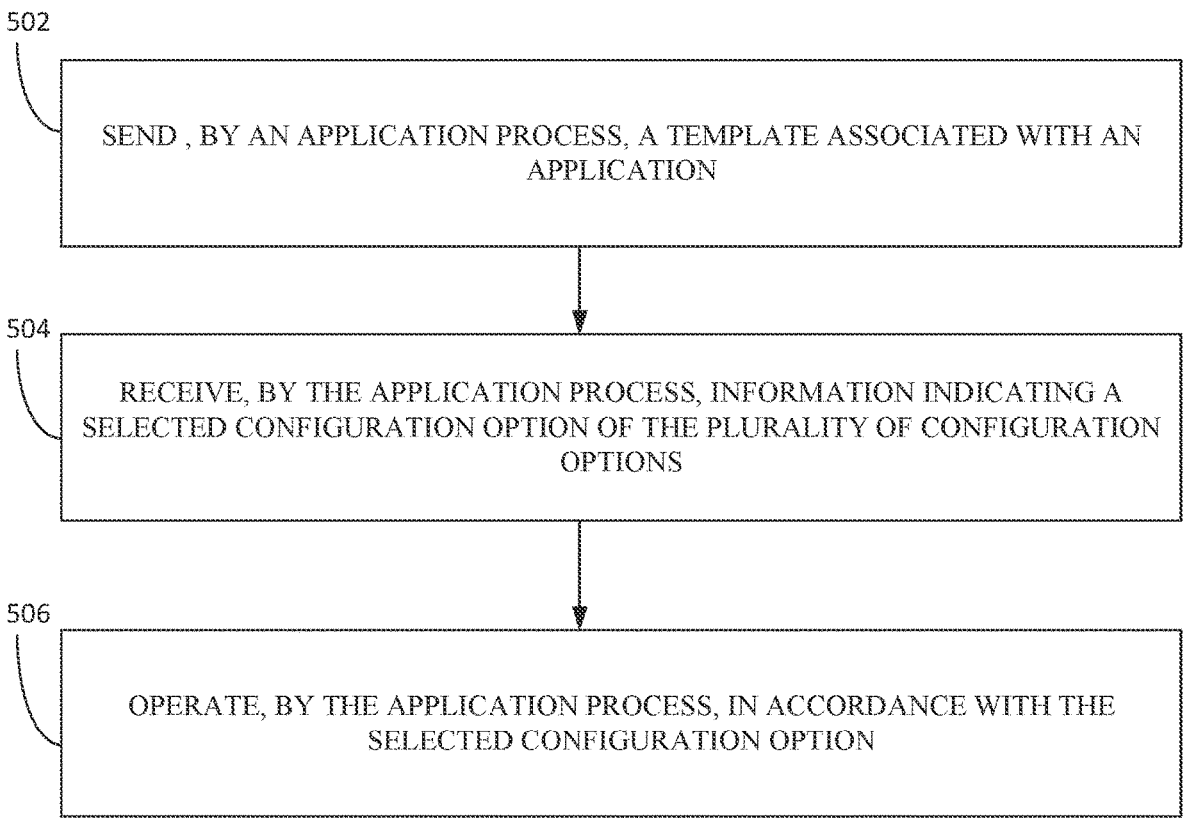
FIG. 5 illustrates a flow diagram of an example process associated with application-specific do not disturb in accordance with one or more implementations.

FIG. 5 illustrates a flow diagram of an example process associated with application-specific do not disturb in accordance with one or more implementations. For explanatory purposes, the process 500 is primarily described herein with reference to the electronic device 102 of FIG. 1. However, the process 500 is not limited to the electronic devices 102 of FIG. 1, and one or more blocks (or operations) of the process 500 may be performed by one or more other components or other suitable devices. Further for explanatory purposes, the blocks of the process 500 are described herein as occurring in serial or linearly. However, multiple blocks of the process 500 may occur in parallel. In addition, the blocks of the process 500 need not be performed in the order shown or one or more blocks of the process 500 need not be performed or can be replaced by other operations.

At block 502, application 201 may send a template (also referred herein as a fillable form) associated with application 201 to system process 202. The template may include a plurality of configuration options for the application and may be displayed using configuration user interface 300. The template may include one or more default identifiers associated with an interruption control mode, in which the default identifiers may restore the application 201 to a previous configuration (e.g., default configuration). System process 202 may store the template until triggered to display or send. Although a template is referred to herein, an application programming interface (API) call may be used or other implementations.

At block 504, application 201 may receive from system process 202, information that indicates a selected configuration option (e.g., a first configuration option) of the plurality of configuration options while electronic device 102 is operated in an interruption control mode. As disclosed herein, there may be interruption control mode identifiers associated with the plurality of configuration options for the interruption control mode.

At block 506, application 201 may operate in accordance with the information received in block 504 (e.g., a first configuration option). Based on the information, application 201 may send or execute instructions to disable a feature associated with application 201, update a configuration of application 201 to a user-selected configuration option associated with the information, or filtering data associated with application 201.

It is contemplated that system process 202 may receive information from application 201 before displaying configuration user interface 300, which may enable system process 202 to not need to call back to application 201 to obtain information to facilitate rendering configuration user interface 300. Alternatively, in one or more implementations, there may be an operation in which system process 202 sends a request to application 201 as configuration user interface 300 is rendered.

As described herein, aspects of the subject technology may include regulating interruptions associated with electronic device 102, such as allowing or denying the use (e.g., display) of certain data. The present disclosure contemplates that in some instances this data may include status data, location-based data, calendar data, text messages, electronic mail, voice data, audio data, video data, images, or other data. A system process (e.g., an operating system) of an electronic device may optionally populate a configuration user interface associated with the interruption control mode with default values or receive values from a user. The operations associated with the disclosed subject matter may occur on one device or may be distributed over many devices.

As described above, one aspect of the disclosed technology is the gathering and use of data available from specific and legitimate sources for application-specific do-not-disturb configuration. The present disclosure contemplates that in some instances, this gathered data may include personal information data that uniquely identifies or can be used to identify a specific person. Such personal information data can include demographic data, location-based data, online identifiers, telephone numbers, email addresses, home addresses, images, videos, audio data, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used for application-specific do-not-disturb configuration. Accordingly, the use of such personal information data may facilitate transactions (e.g., online transactions). Further, other uses for personal information data that benefit the user are also contemplated by the present disclosure. For instance, health and fitness data may be used, in accordance with the user's preferences to provide insights into their general wellness or may be used as positive feedback to individuals using technology to pursue wellness goals.

The present disclosure contemplates that those entities responsible for the collection, analysis, disclosure, transfer, storage, or other use of such personal information data will comply with well-established privacy policies or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users and should be updated as the collection or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected or accessed and adapted to applicable laws and standards, including jurisdiction-specific considerations which may serve to impose a higher standard. For instance, in the US, collection of or access to certain health data may be governed by federal or state laws, such as the Health Insurance Portability and Accountability Act (HIPAA); whereas health data in other countries may be subject to other regulations and policies and should be handled accordingly.

The present disclosure also contemplates implementations in which users selectively block the use of, or access to, particular data (e.g., personal information data) to implement the disclosed application-specific do not disturb configuration. The present disclosure contemplates that hardware or software elements can be provided to prevent or block access to such personal information data. For example, the present technology can be configured to allow users to select to configure sub-options that "opt in" or opt out" of participation in the collection of personal information data for interruption control mode for a particular application or all applications. In addition to providing "opt in" and "opt out" options, the present disclosure contemplates providing notifications relating to the access or use of personal information. For instance, a user may be notified upon selecting an option associated with configuration user interface that their personal information data will be accessed and then reminded again at some later time.

Moreover, it is the intent of the present disclosure that information associated with a user should be managed and handled in a way to minimize risks of unintentional or unauthorized access or use. Risk can be minimized by limiting the collection of data and deleting data once it is no longer needed. In addition, and when applicable data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), or other methods such as differential privacy.

Therefore, although the present disclosure broadly covers use of information (which may include personal information data) to implement one or more various exemplary implementations, the present disclosure also contemplates that the various exemplary implementations may also be implemented without the need for accessing such personal information data. The various exemplary implementations of the present technology are not rendered inoperable due to the lack of all or a portion of personal information data.

Figure 6:
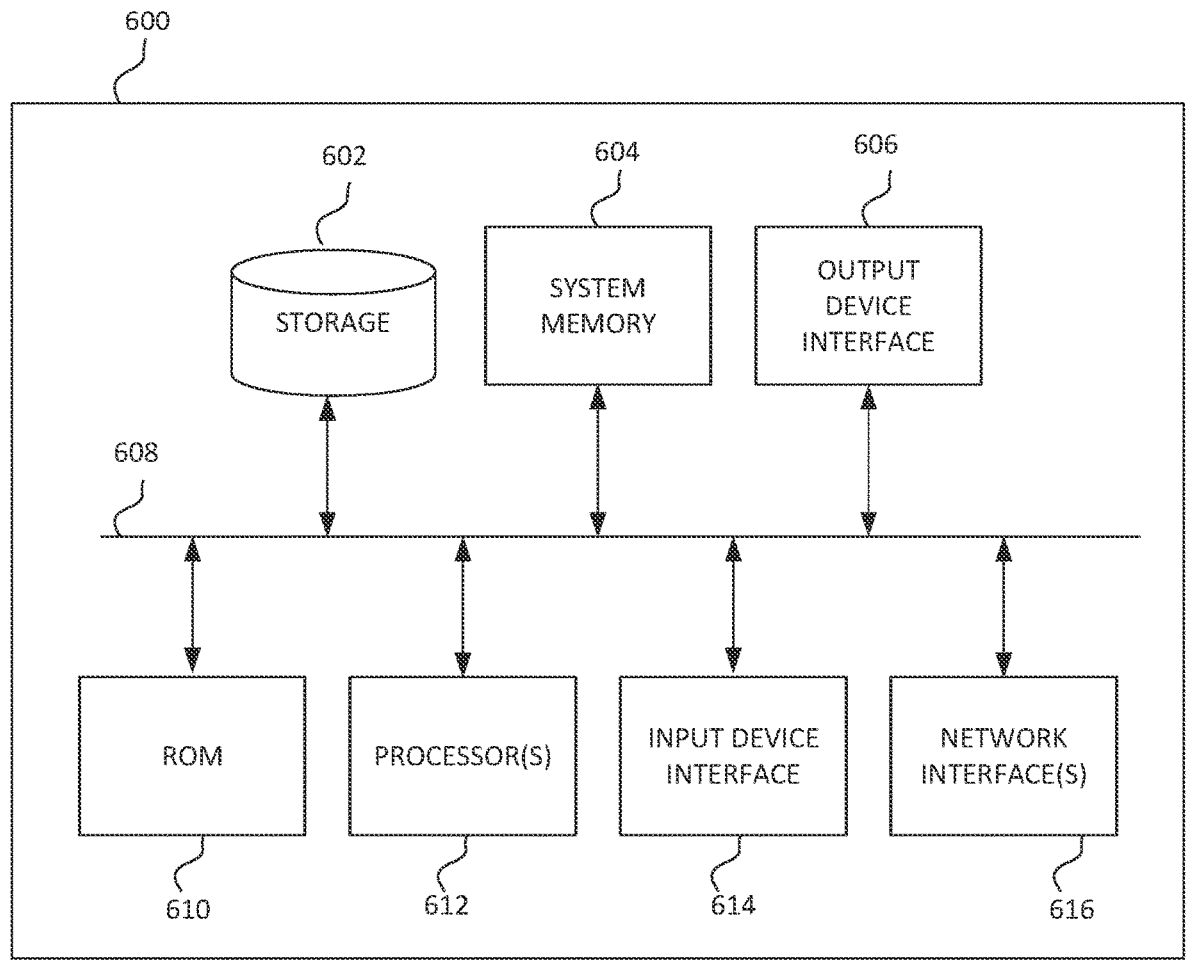
FIG. 6 illustrates an example electronic system with which aspects of the subject technology may be implemented in accordance with one or more implementations.

FIG. 6 illustrates an electronic system 600 with which one or more implementations of the subject technology may be implemented. The electronic system 600 can be, or can be a part of, one or more of the electronic devices (e.g., electronic device 102, electronic device104, or electronic device108) or the servers 120 shown in FIG. 1. The electronic system 600 may include various types of computer readable media and interfaces for various other types of computer readable media. The electronic system 600 includes a bus 608, one or more processing unit(s) 612, a system memory 604 (or buffer), a ROM 610, a permanent storage device 602, an input device interface 614, an output device interface 606, and one or more network interfaces 616, or subsets and variations thereof.

The bus 608 collectively represents all system, peripheral, and chipset buses that communicatively connect the numerous internal devices of the electronic system 600. In one or more implementations, the bus 608 communicatively connects the one or more processing unit(s) 612 with the ROM 610, the system memory 604, and the permanent storage device 602. From these various memory units, the one or more processing unit(s) 612 retrieves instructions to execute and data to process in order to execute the processes of the subject disclosure. The one or more processing unit(s) 612 can be a single processor or a multi-core processor in different implementations.

The ROM 610 stores static data and instructions that are needed by the one or more processing unit(s) 612 and other modules of the electronic system 600. The permanent storage device 602, on the other hand, may be a read-and-write memory device. The permanent storage device 602 may be a non-volatile memory unit that stores instructions and data even when the electronic system 600 is off. In one or more implementations, a mass-storage device (such as a magnetic or optical disk and its corresponding disk drive) may be used as the permanent storage device 602.

In one or more implementations, a removable storage device (such as a floppy disk, flash drive, and its corresponding disk drive) may be used as the permanent storage device 602. Like the permanent storage device 602, the system memory 604 may be a read-and-write memory device. However, unlike the permanent storage device 602, the system memory 604 may be a volatile read-and-write memory, such as random-access memory. The system memory 604 may store any of the instructions and data that one or more processing unit(s) 612 may need at runtime. In one or more implementations, the processes of the subject disclosure are stored in the system memory 604, the permanent storage device 602, or the ROM 610. From these various memory units, the one or more processing unit(s) 612 retrieves instructions to execute and data to process in order to execute the processes of one or more implementations.

The bus 608 also connects to the input and output device interfaces 614 and 606. The input device interface 614 enables a user to communicate information and select commands to the electronic system 600. Input devices that may be used with the input device interface 614 may include, for example, alphanumeric keyboards and pointing devices (also called "cursor control devices"). The output device interface 606 may enable, for example, the display of images generated by electronic system 600. Output devices that may be used with the output device interface 606 may include, for example, printers and display devices, such as a liquid crystal display (LCD), a light emitting diode (LED) display, an organic light emitting diode (OLED) display, a flexible display, a flat panel display, a solid-state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

As shown in FIG. 6, the bus 608 also couples the electronic system 600 to one or more networks or to one or more network nodes, such as the servers 120 shown in FIG. 1, through the one or more network interface(s) 616. In this manner, the electronic system 600 can be a part of a network of computers (such as a LAN, a wide area network ("WAN"), or an Intranet, or a network of networks, such as the Internet. Any or all components of the electronic system 600 can be used in conjunction with the subject disclosure.

In accordance with aspects of the disclosure, a method is provided that includes storing information associated with a first configuration option of a plurality of configuration options for an interruption control mode; receiving an indication of a triggering event for the interruption control mode; and in response to the indication of the triggering event, sending the information associated with the first configuration option to an application. The method may include displaying a user interface based on at least a template associated with the application, the template associated with the application comprising the plurality of configuration options for the interruption control mode. The method may include receiving the template from the application.

In accordance with aspects of the disclosure, a non-transitory machine-readable medium is provided storing instructions that, when executed by one or more processors, cause the one or more processors to perform operations that include storing information associated with a first configuration option of a plurality of configuration options for an interruption control mode; receiving an indication of a triggering event for the interruption control mode; and in response to the indication of the triggering event, sending the information associated with the first configuration option to an application. The operations may include displaying a user interface based on at least a template associated with the application, the template associated with the application comprising the plurality of configuration options for the interruption control mode. The operations may include receiving the template from the application.

In accordance with aspects of the disclosure, a method is provided that includes sending, by an application process and to a system process, a template associated with an application, the template comprising a plurality of configuration options for the application; receiving, by the application process and from the system process, information indicating a selected configuration option of the plurality of configuration options, the receiving being while the device is operated in an interruption control mode; and in response to receiving the information, operating, by the application process, in accordance with the selected configuration option. The method may include sending, to the system process, a default identifier associated with the interruption control mode; subsequently receiving the default identifier from the system process; and in response to receiving the default identifier, restoring a previous configuration associated with the application.

In accordance with aspects of the disclosure, a non-transitory machine-readable medium is provided storing instructions that, when executed by one or more processors, cause the one or more processors to perform operations that include sending, by an application process and to a system process, a template associated with an application, the template comprising a plurality of configuration options for the application; receiving, by the application process and from the system process, information indicating a selected configuration option of the plurality of configuration options, the receiving being while the device is operated in an interruption control mode; and in response to receiving the information, operating, by the application process, in accordance with the selected configuration option. The operations may include sending, to the system process, a default identifier associated with the interruption control mode; subsequently receiving the default identifier from the system process; and in response to receiving the default identifier, restoring a previous configuration associated with the application.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics, or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled with a computing device, while in other implementations, the tangible computer-readable storage medium can be indirectly coupled with a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, or at least one of any combination of the items, or at least one of each of the items. By way of example, the phrases "at least one of A, B, and C" or "at least one of A, B, or C" each refer to only A, only B, or only C; any combination of A, B, and C; or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation, or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A device comprising:
a processor; and
memory coupled with the processor, the memory storing executable instructions that when executed by the processor cause the device to effectuate operations comprising:
  storing, by a system process, an interruption control mode identifier corresponding to a first configuration option of a plurality of configuration options for an interruption control mode, wherein the interruption control mode identifier is received by the system process from an application on the device without receiving or storing the first configuration option;
  receiving, by the system process, an indication of a triggering event for the interruption control mode; and
  in response to the indication of the triggering event, sending, by the system process, the interruption control mode identifier corresponding to the first configuration option to the application without informing the application of the interruption control mode corresponding to the triggering event.

2. The device of claim 1, the operations further comprising displaying a user interface based on at least a template associated with the application, the template associated with the application comprising the plurality of configuration options for the interruption control mode.

3. The device of claim 2, the operations further comprising capturing, by the displayed user interface, a selection of the first configuration option of the plurality of configuration options for the interruption control mode.

4. The device of claim 2, the operations further comprising receiving the template from the application.

5. The device of claim 1, the operations further comprising:
  in response to sending the interruption control mode identifier corresponding to the first configuration option to the application, receiving an indication to silence a notification associated with the application.

6. The device of claim 1, wherein the interruption control mode identifier corresponds to a first interruption control mode identifier of a plurality of interruption control mode identifiers, wherein each of the plurality of interruption control mode identifiers are associated with respective configuration options for the interruption control mode.

7. The device of claim 6, the operations further comprising:
  receiving a default identifier associated with the interruption control mode associated with the application, wherein the interruption control mode identifiers comprise the default identifier;
  receiving an indication of a deactivation of the interruption control mode associated with the application; and
  in response to the indication of the deactivation, sending the default identifier to the application to restore a previous configuration.

8. A method comprising:
storing, by a system process of a device, an interruption control mode identifier corresponding to a first configuration option of a plurality of configuration options for an interruption control mode, wherein the interruption control mode identifier is received by the system process from an application on the device without receiving or storing the first configuration option;
receiving, by the system process, an indication of a triggering event for the interruption control mode; and
in response to the indication of the triggering event, sending, by the system process, the interruption control mode identifier corresponding to the first configuration option to the application without informing the application of the interruption control mode corresponding to the triggering event.

9. The method of claim 8, further comprising displaying a user interface based on at least a template associated with the application, the template associated with the application comprising the plurality of configuration options for the interruption control mode.

10. The method of claim 9, further comprising capturing, by the displayed user interface, a selection of the first configuration option of the plurality of configuration options for the interruption control mode.

11. The method of claim 9, further comprising receiving the template from the application.

12. The method of claim 8, further comprising:
  in response to sending the interruption control mode identifier corresponding to the first configuration option to the application, receiving an indication to silence a notification associated with the application.

13. The method of claim 8, wherein the interruption control mode identifier corresponds to a first interruption control mode identifier of a plurality of interruption control mode identifiers, wherein each of the plurality of interruption control mode identifiers are associated with respective configuration options for the interruption control mode.

14. The method of claim 13, further comprising:

receiving a default identifier associated with the interruption control mode associated with the application, wherein the plurality of interruption control mode identifiers comprise the default identifier;

receiving an indication of a deactivation of the interruption control mode associated with the application; and in response to the indication of the deactivation, sending the default identifier to the application to restore a previous configuration.

15. A non-transitory computer readable storage medium storing computer executable instructions that when executed by a device cause the device to effectuate operations comprising: storing, by a system process of the device, an interruption control mode identifier corresponding to a first configuration option of a plurality of configuration options for an interruption control mode, wherein the interruption control mode identifier is received by the system process from an application on the device without receiving or storing the first configuration option; receiving, by the system process, an indication of a triggering event for the interruption control mode; and in response to the indication of the triggering event, sending, by the system process, the interruption control mode identifier corresponding to the first configuration option to the application without informing the application of the interruption control mode corresponding to the triggering event.

16. The non-transitory computer readable storage medium of claim 15, the operations further comprising displaying a user interface based on at least a template associated with the application, the template associated with the application comprising the plurality of configuration options for the interruption control mode.

17. The non-transitory computer readable storage medium of claim 16, the operations further comprising capturing, by the displayed user interface, a selection of the first configuration option of the plurality of configuration options for the interruption control mode.

18. The non-transitory computer readable storage medium of claim 16, the operations further comprising receiving the template from the application.

19. The non-transitory computer readable storage medium of claim 15, the operations further comprising: in response to sending the interruption control mode identifier corresponding to the first configuration option to the application, receiving an indication to silence a notification associated with the application.

20. The non-transitory computer readable storage medium of claim 15, wherein the triggering event is based on a time period, a location, or a use of a second application on the device.

* * * * *